US010551824B2

(12) United States Patent
Shapiro et al.

(10) Patent No.: US 10,551,824 B2
(45) Date of Patent: Feb. 4, 2020

(54) CONTROLLED DECELERATION OF MOVEABLE COMPONENTS IN A COMPUTER NUMERICALLY CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Matthew Sarnoff, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 81 days.

(21) Appl. No.: 15/823,513

(22) Filed: Nov. 27, 2017

(65) Prior Publication Data

US 2018/0150062 A1    May 31, 2018

Related U.S. Application Data

(60) Provisional application No. 62/426,427, filed on Nov. 25, 2016.

(51) Int. Cl.
*G05B 19/416* (2006.01)
*G05B 19/409* (2006.01)
*G05B 19/4093* (2006.01)

(52) U.S. Cl.
CPC ........ *G05B 19/416* (2013.01); *G05B 19/409* (2013.01); *G05B 19/4093* (2013.01); *G05B 2219/43* (2013.01)

(58) Field of Classification Search
CPC ............... G05B 19/416; G05B 19/409; G05B 19/4093; G05B 19/4097; G05B 19/4155
See application file for complete search history.

(56) References Cited

U.S. PATENT DOCUMENTS 3,721,811 A * 3/1973 Taylor ................. G05B 19/416
                                                    318/163
3,967,176 A * 6/1976 Wagener ................ B24B 49/18
                                                    318/603

(Continued)

FOREIGN PATENT DOCUMENTS

CN        101095033 A    12/2007
CN        101733558 A     6/2010
(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.

(Continued)

*Primary Examiner* — Chun Cao
*Assistant Examiner* — Charles Cai
(74) *Attorney, Agent, or Firm* — Mintz Levin Cohn Ferris Glovsky and Popeo, P.C.

(57) ABSTRACT

A method of altering a rate of executing a motion plan by a computer-numerically-controlled machine can include: receiving, at a control unit of a computer-numerically-controlled machine and from a general purpose computer that is housed separately from the computer-numerically-controlled machine, a motion plan defining operations for causing movement of a moveable component of the computer-numerically-controlled machine; and altering, in response to a command received at the computer-numerically-controlled machine, a first execution rate of the operations to a second execution rate of the operations to change a rate of movement of the movable component. Systems and articles of manufacture, including computer program products, are also provided.

18 Claims, 12 Drawing Sheets

(56) References Cited

U.S. PATENT DOCUMENTS

| | | | |
|---|---|---|---|
| 4,055,787 A * | 10/1977 | Beadle | G05B 19/18 318/569 |
| 4,138,718 A | 2/1979 | Toke et al. | |
| 4,650,287 A | 3/1987 | Kudo et al. | |
| 4,723,219 A * | 2/1988 | Beyer | G05B 19/4067 318/572 |
| 4,901,359 A | 2/1990 | Bruder | |
| 4,918,611 A | 4/1990 | Shyu et al. | |
| 5,298,843 A | 3/1994 | Miyajima et al. | |
| 5,355,250 A | 10/1994 | Grasso et al. | |
| 5,396,279 A | 3/1995 | Vossen | |
| 5,475,521 A | 12/1995 | Heidemann | |
| 5,756,961 A | 5/1998 | Sato et al. | |
| 6,031,200 A | 2/2000 | Whitehouse | |
| 6,609,044 B1 | 8/2003 | Basista et al. | |
| 6,628,322 B1 | 9/2003 | Cerruti | |
| 7,005,606 B2 | 2/2006 | Legge et al. | |
| 8,111,904 B2 | 2/2012 | Wallack et al. | |
| 8,136,432 B2 | 3/2012 | Travez et al. | |
| 8,809,780 B2 | 8/2014 | Wollenhaupt et al. | |
| 9,020,628 B2 | 4/2015 | Fagan | |
| 9,235,205 B2 | 1/2016 | Prestidge et al. | |
| 9,469,338 B2 | 10/2016 | Norberg Ohlsson | |
| 9,618,926 B1 | 4/2017 | Louette et al. | |
| 9,734,419 B1 | 8/2017 | Ye et al. | |
| 9,912,915 B2 | 3/2018 | Sinclair | |
| 9,987,798 B2 | 6/2018 | Tyler | |
| 10,234,260 B2 | 3/2019 | Siercks et al. | |
| 2001/0012973 A1 | 8/2001 | Wehrli et al. | |
| 2002/0129485 A1 | 9/2002 | Mok et al. | |
| 2003/0049373 A1 | 3/2003 | Van De Rijdt et al. | |
| 2004/0207831 A1 | 10/2004 | Aoyama | |
| 2004/0223165 A1 | 11/2004 | Kurokawa et al. | |
| 2005/0051523 A1 | 3/2005 | Legge et al. | |
| 2005/0069682 A1 | 3/2005 | Tseng | |
| 2005/0071020 A1 | 3/2005 | Yamazaki et al. | |
| 2005/0115941 A1 | 6/2005 | Sukhman et al. | |
| 2005/0187651 A1 | 8/2005 | Kimura et al. | |
| 2008/0149604 A1 | 6/2008 | Varriano-Marston et al. | |
| 2008/0160254 A1 | 7/2008 | Arnold | |
| 2008/0243299 A1 | 10/2008 | Johnson et al. | |
| 2008/0249653 A1 | 10/2008 | Ichikawa | |
| 2009/0250445 A1 | 10/2009 | Yamaguchi et al. | |
| 2010/0063603 A1 | 3/2010 | Chandhoke | |
| 2010/0081971 A1 | 4/2010 | Allison | |
| 2010/0149337 A1 | 6/2010 | Porcino | |
| 2010/0193482 A1 * | 8/2010 | Ow | B23K 26/38 219/121.67 |
| 2010/0274379 A1 | 10/2010 | Hehl | |
| 2010/0301023 A1 | 12/2010 | Unrath et al. | |
| 2011/0127333 A1 | 6/2011 | Veksland et al. | |
| 2011/0193943 A1 | 8/2011 | Campbell | |
| 2011/0316977 A1 | 12/2011 | Pienaar | |
| 2012/0035745 A1 | 2/2012 | Mori et al. | |
| 2012/0117787 A1 | 5/2012 | Sun et al. | |
| 2012/0197427 A1 | 8/2012 | Gallucci et al. | |
| 2012/0293821 A1 | 11/2012 | Chiba | |
| 2013/0158957 A1 | 6/2013 | Lee et al. | |
| 2013/0190898 A1 | 7/2013 | Shilpiekandula et al. | |
| 2013/0200053 A1 | 8/2013 | Bordatchev | |
| 2013/0304248 A1 | 11/2013 | Lange et al. | |
| 2014/0005804 A1 | 1/2014 | Brand | |
| 2014/0018779 A1 | 1/2014 | Worrell et al. | |
| 2014/0039707 A1 | 2/2014 | Curtis et al. | |
| 2014/0071330 A1 | 3/2014 | Zhang et al. | |
| 2014/0071502 A1 | 3/2014 | Liu | |
| 2014/0160273 A1 | 6/2014 | Jedynak et al. | |
| 2014/0310122 A1 | 10/2014 | Danielson et al. | |
| 2015/0107033 A1 | 4/2015 | Chang et al. | |
| 2015/0108095 A1 | 4/2015 | Kruer et al. | |
| 2015/0112470 A1 | 4/2015 | Chang et al. | |
| 2015/0212421 A1 | 7/2015 | deVilliers et al. | |
| 2015/0245549 A1 | 8/2015 | Kurita et al. | |
| 2015/0355621 A1 | 12/2015 | Ikeda et al. | |
| 2016/0084649 A1 | 3/2016 | Yamazaki et al. | |
| 2016/0147213 A1 * | 5/2016 | Murakami | G05B 19/19 700/188 |
| 2016/0156771 A1 | 6/2016 | Lee | |
| 2016/0199945 A1 | 7/2016 | McDowell et al. | |
| 2016/0210737 A1 | 7/2016 | Straub et al. | |
| 2016/0271718 A1 | 9/2016 | Fagan | |
| 2016/0303845 A1 | 10/2016 | Arce | |
| 2016/0325541 A1 | 11/2016 | Lavrentyev et al. | |
| 2017/0045877 A1 | 2/2017 | Shapiro et al. | |
| 2017/0045879 A1 * | 2/2017 | Yang | G05B 19/414 |
| 2017/0235293 A1 | 8/2017 | Shapiro et al. | |
| 2017/0235294 A1 | 8/2017 | Shapiro et al. | |
| 2018/0113434 A1 | 4/2018 | Shapiro et al. | |
| 2018/0147657 A1 | 5/2018 | Shapiro | |
| 2018/0147658 A1 | 5/2018 | Shapiro | |
| 2018/0147659 A1 | 5/2018 | Shapiro | |
| 2018/0150047 A1 | 5/2018 | Shapiro | |
| 2018/0150055 A1 | 5/2018 | Shapiro | |
| 2018/0150058 A1 | 5/2018 | Shapiro | |

FOREIGN PATENT DOCUMENTS

| | | |
|---|---|---|
| DE | 10 2014 214058 A1 | 1/2016 |
| EP | 0954125 A2 | 11/1999 |
| EP | 1309108 A1 | 5/2003 |
| EP | 2471625 A2 | 7/2012 |
| EP | 2808123 A1 | 12/2014 |
| JP | H03 254380 A | 11/1991 |
| JP | 04244347 A | 9/1992 |
| JP | 2002123306 A * | 4/2002 |
| WO | WO-94/03302 A1 | 2/1994 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA*. 2010 IEEE. May 11, 2010. pp. 445-448.

* cited by examiner

CONTROLLED DECELERATION OF MOVEABLE COMPONENTS IN A COMPUTER NUMERICALLY CONTROLLED MACHINE

CROSS REFERENCE TO RELATED APPLICATION

This application claims priority to U.S. Provisional Application No. 62/426,427, filed on Nov. 25, 2016 and entitled CONTROLLED DECELERATION OF MOVING COMPONENTS IN A CNC MACHINE, the disclosure of which is incorporated herein by reference in its entirety.

TECHNICAL FIELD

The subject matter described herein relates to computerized processes for implementing motion commands in a computer-numerically-controlled machine.

BACKGROUND

Computer-numerically-controlled (CNC) machines operate by moving a tool, such as a laser, drill bit, or the like, over a material to be machined. The tool is moved by motors, belts, or other actuators in response to commands received from a control system. The speed of a tool can be a function of physical machine inertia, the particular commands given, the size of a motion step for the tool, or the like.

SUMMARY

In one aspect, a control unit of a computer-numerically-controlled (CNC) machine receives, from a general purpose computer that is housed separately from a computer-numerically-controlled machine, a motion plan defining operations for causing movement of a moveable component of the computer-numerically-controlled machine. In response to a command received at the computer-numerically-controlled machine, a first execution rate of the operations is altered to a second execution rate of the operations to change a rate of movement of the movable component.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, controlled deceleration can enable a smooth halting and resumption of CNC machine operations. This can allow for materials being worked to have a minimum of undesired effects that can sometimes occur when a machining operation is interrupted. While there are existing approaches that can enable certain aspects of controlled deceleration of CNC components, the current subject matter can, among other advantages, make use of a "clock stretching" technique, which allows deceleration and subsequent re-acceleration to occur in a controlled manner such that a material being worked on during a needed stoppage or deceleration can be processed despite the stoppage or deceleration such that an end product produced by a work flow including the controlled deceleration and The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods for controlled deceleration in a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
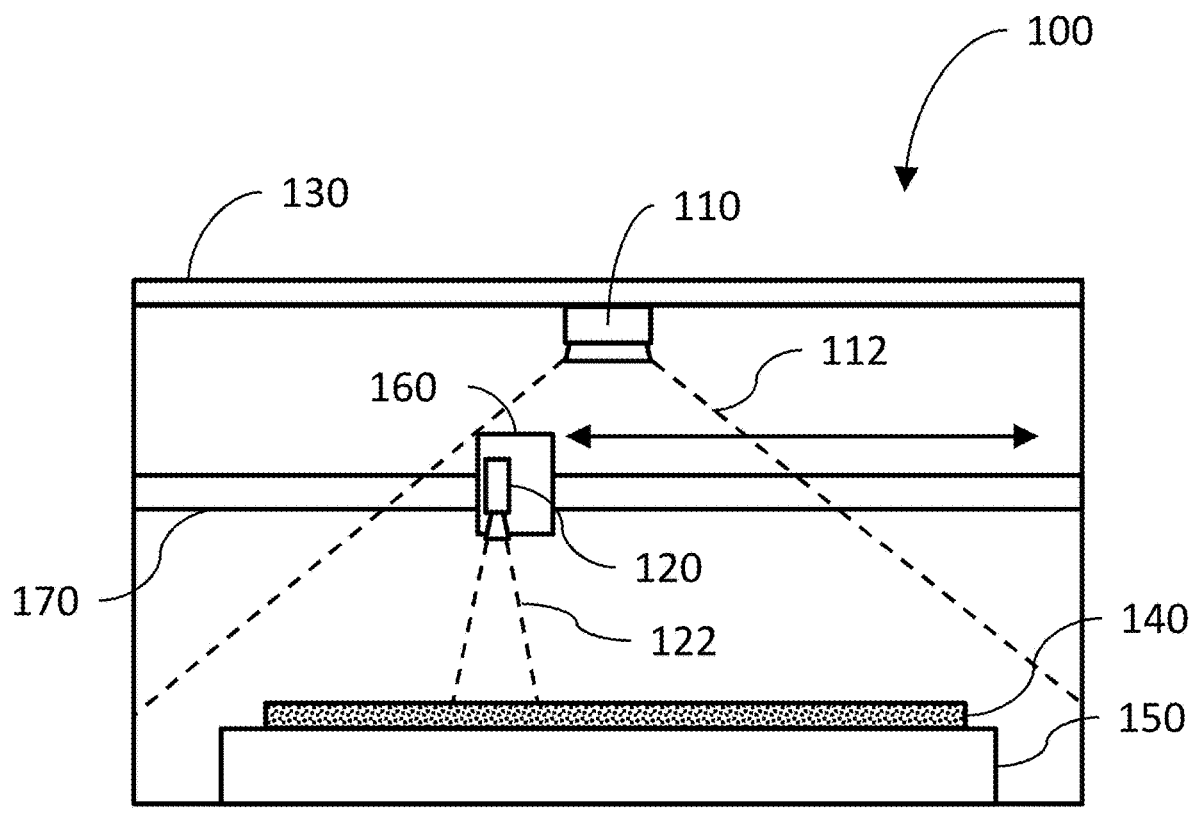
FIG. 1 is an elevational view of a CNC machine with a camera positioned to capture an image of the entire material bed and another camera positioned to capture an image of a portion of the material bed, consistent with some implementations of the current subject matter.
Figure 1:
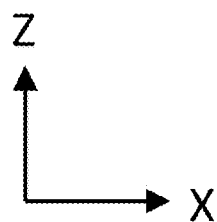

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material, such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
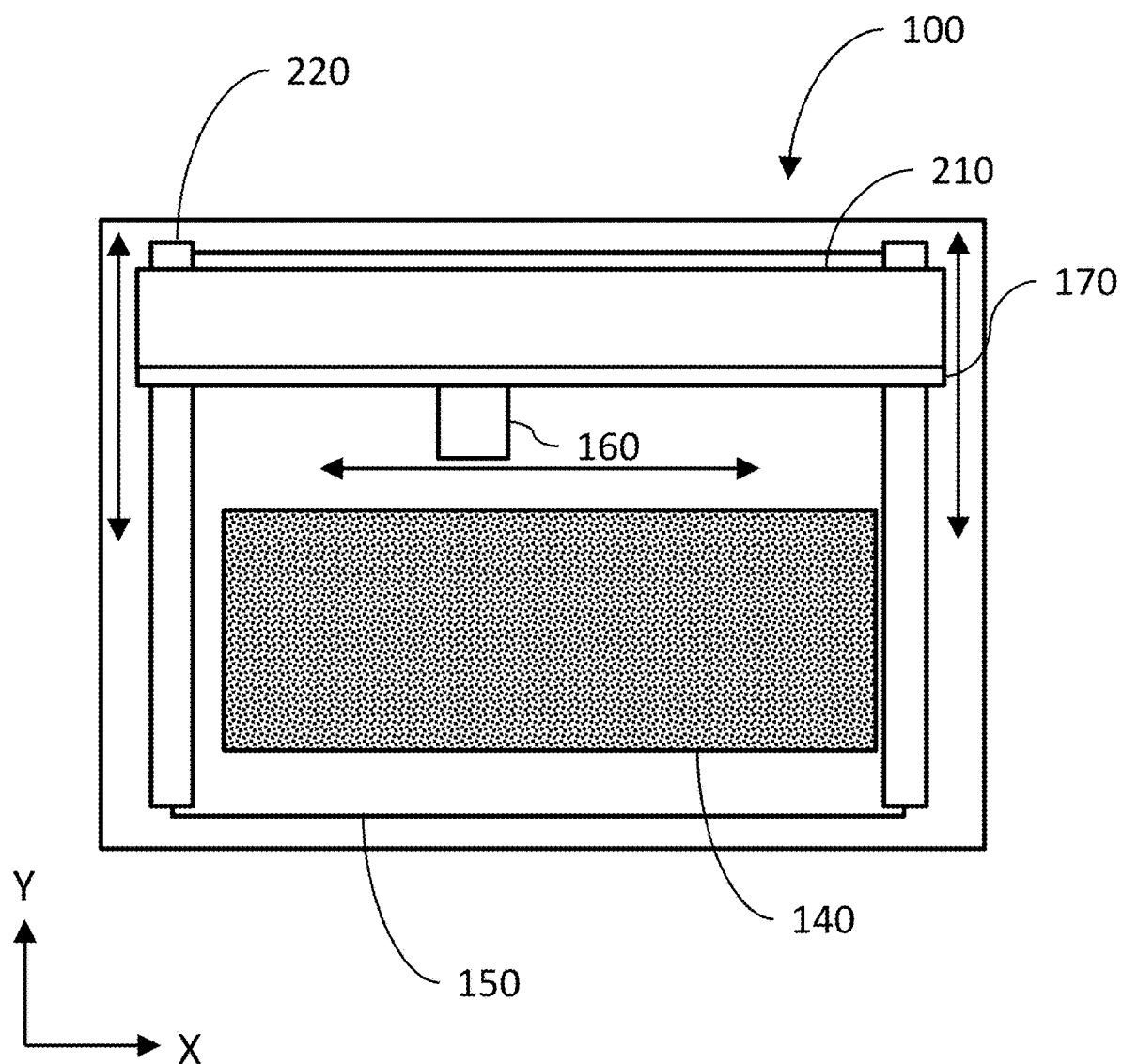
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine, for example by fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation. A transitory (or otherwise unaccounted for) slowing of a speed at which the laser is moved across the material can damage or destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant. In laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, via a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

Figures 3A, 3B, 3C:
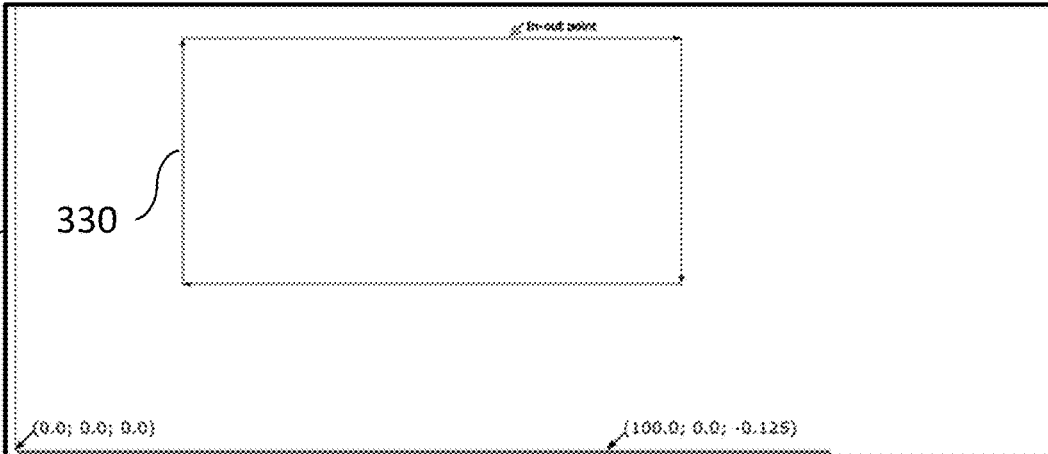
FIG. 3A is a diagram illustrating one example of an SVG source file, consistent with some implementations of the current subject matter.
FIG. 3B is an example of a graphical representation of the cut path in the CNC machine, consistent with some implementations of the current subject matter.
FIG. 3C is a diagram illustrating the machine file corresponding to the cut path and the source file, consistent with some implementations of the current subject matter.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle, the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information, for example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors, among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for example for extreme depth of field so that both near and far objects may be in focus, or one or more of many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
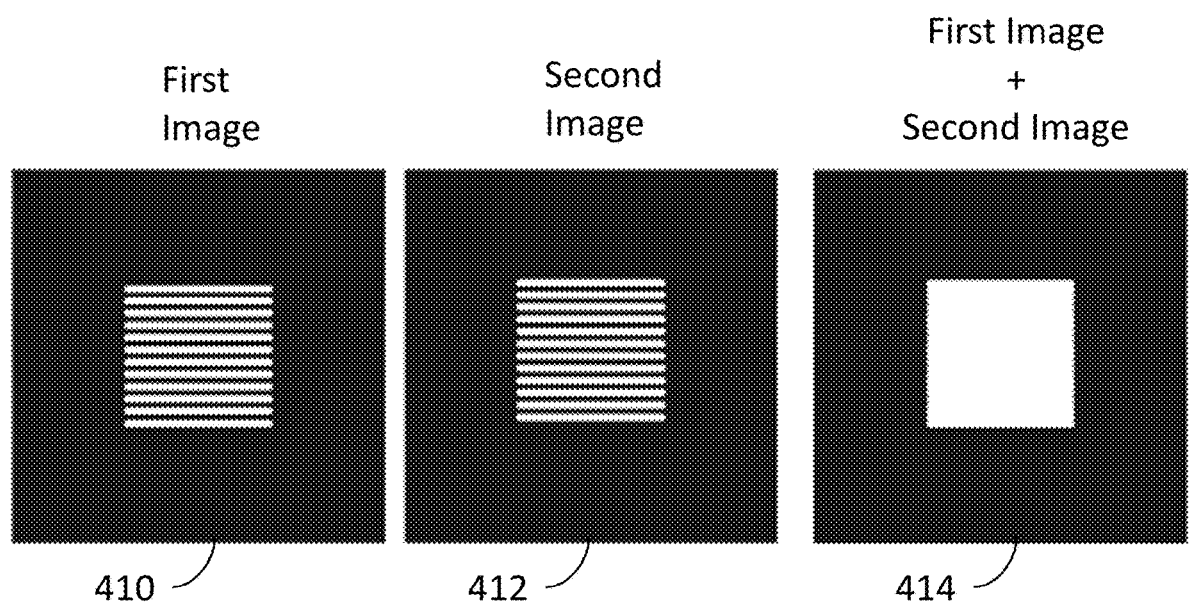
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
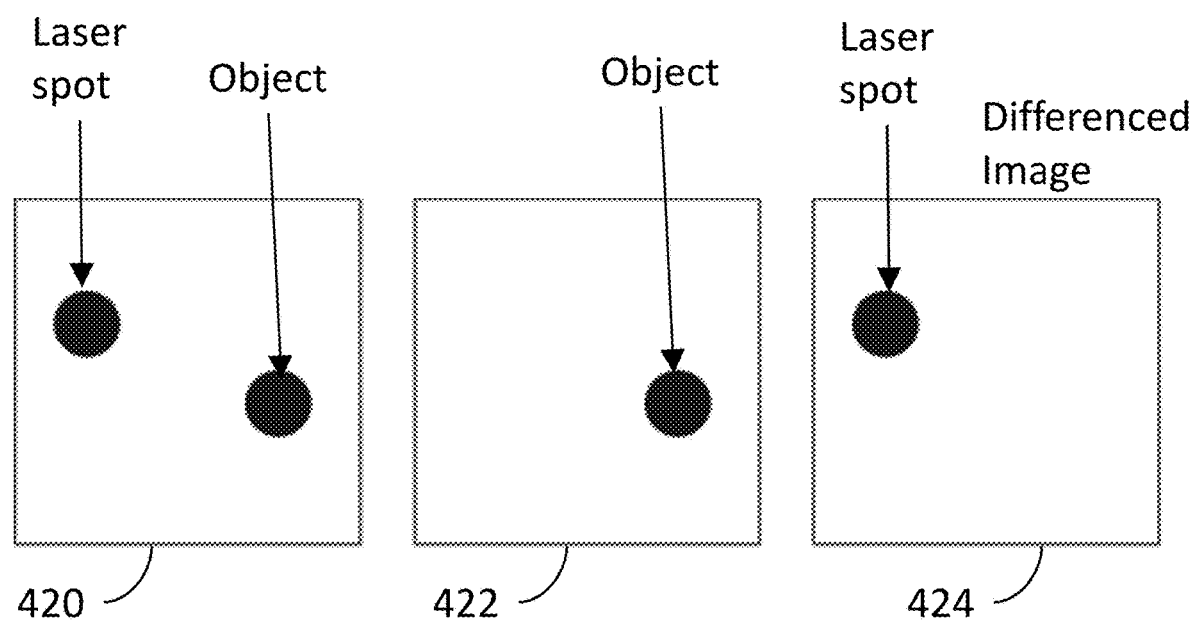
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
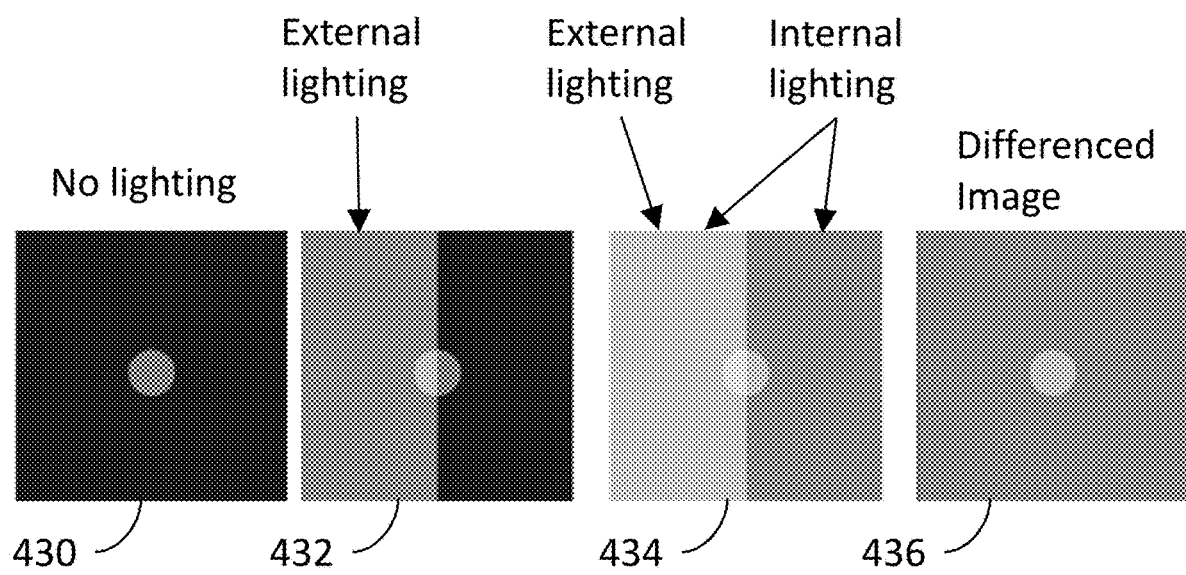
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $\frac{1}{60}^{th}$ of a second, or less than $\frac{1}{120}^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Real-Time Motion Planner

Figure 5:
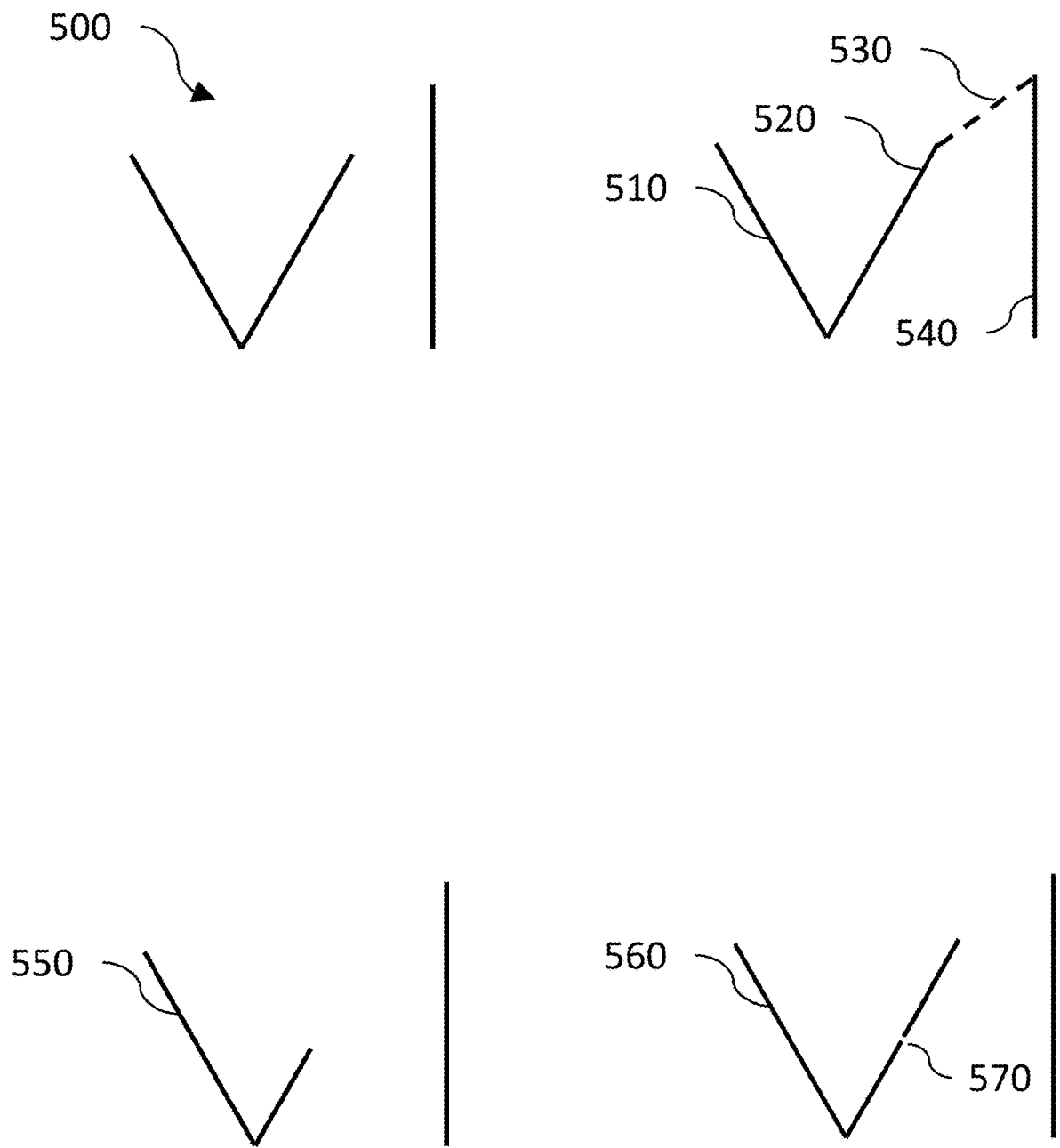
FIG. 5 is a diagram illustrating an example of determination of a safe pause point in a motion and/or execution plan for a CNC machine, consistent with some implementations of the current subject matter.

FIG. 5 is a diagram illustrating an example of determination of a safe pause point in a motion and/or execution plan for a CNC machine consistent with some implementations of the current subject matter. Currently available CNC machines typically operate by having a machine file, for example in the G-code language, loaded on to it. A motion planner executing on the CNC machine calculates the motions required by the actuators (such as steppers and servomotors) based on the machine file and causes execution of these motions in realtime or near-realtime. The execution of such a motion planner must be fast enough that it can generate new elements of the motion plan as quickly as the machine can execute them, and will often make tradeoffs in accuracy to ensure that it presents the next set of output data to the actuators when required. While there may be a small buffer in case of instantaneous delay, the design assumes that the motion planner is fast enough and coupled closely enough to the actual CNC machine that a loss of connection between the motion planner and CNC machine is not possible.

An alternate approach in which the CNC machine and the motion planner are separated is possible consistent with implementations of the current subject matter. In this case, the CNC machine and the one or more processors implementing the motion planner may be connected by a cable such as a USB cable or a network such as the Internet, a local area network, a wide area network, or the like. In such a configuration, the data connection between the motion planner and the CNC machine may be cut, data transmission may be slow or lossy (e.g. data packets might be delayed or lost), and/or other issues may affect reliability and timeliness of receipt of commands from the motion planner at the CNC machine.

Use of a motion planner implemented on a computing device separate from the CNC machine can present a number of challenges, including but not limited to handling of a connectivity difficulty between the two machines (CNC and motion planner) that occurs midway through a fabrication operation. Such an occurrence is unlikely in conventional approaches in which the motion planner is integrated into the CNC machine. In contrast, it is virtually guaranteed to occur when the motion planner is connected to the CNC via a network. When the motion planner is integrated in the CNC machine, an interrupted motion plan would result in the work aborting and tremendous manual effort required to restart it, with a likely outcome that the fabrication process does not turn out entirely as intended. For example, the laser might turn off suddenly, and realigning it so it can be restarted can be a manual undertaking that may result in noticeable imperfections.

Despite these challenges, a configuration consistent with implementations of the current subject matter in which the motion planner is not implemented on a same machine or on machine that is directly connected to the CNC machine can be highly desirable. CNC machines that incorporate the motion planner must include the motion planner in their cost, which can be a substantial price, especially for advanced motion planners that calculate second, third, fourth, and higher order derivatives of position and forces on the machine in order to minimize wear and provide optimal results. If the motion planner is connected via the Internet, it may be a resource that is shared among many machines. In another improvement that may be possible with one or more implementations of the current subject matter, CNC machines that integrate the motion planner generally impose a realtime requirement. In other words, they must include sufficient processing power to keep up with the motion of the machine. As a result, such motion planners can require a tradeoff between accuracy (performing more calculations per unit of time) and cost (including a more expensive processor that can complete those calculations). In another improvement that may be possible with one or more implementations of the current subject matter, using a separate motion planner can allow repurposing of a general-purpose computer, such as a high powered workstation or server in a cloud hosting provider, temporarily for the execution of the machining operation, before returning it to other, non-machining-related tasks.

The following describes two example approaches to addressing challenges that may arise with implementations of the current subject matter in which the motion planner and CNC machine are separated.

In a first approach, the motion planner can calculate the motion plan in motion plan or execution plan segments. Each segment contains the instructions to perform a series of useful machining operations, and then instructions to put the CNC machine in a state where it may be safely paused and then resumed. This state is referred to elsewhere herein as a safe pause point, and can optionally include a state in which a moveable head of the CNC device is not moving and/or moving but not cutting. Optionally, the safe pause point can be an end of the motion plan. A motion or execution plan segment consistent with this implementation of the current subject matter can be limited to the size of a buffer present on the CNC machine, so it may be loaded into that buffer in its entirety. A segment may contain the entirety of a machining operation, or it may contain a portion of it and the instructions to reach a next safe pause point.

A simple example is illustrated in the diagram of FIG. 5, which shows features of a machining operation that uses a laser cutter/engraver to engrave the letters "v l" 500. The required operations are as follows:
1) laser turn on instruction
2) downward-right line 510
3) upward-right line 520
4) laser turn off instruction
5) upward-right line 530
6) laser turn on
7) downward line 540
8) laser turn off Note that these are inputs to the motion planner. The output of the motion planner—the motion plan—is a series of instructions such as electrical impulses that can be used to direct the motors' and other actuators' operations. A typical motion planner would calculate the electrical impulses to implement these commands and send them to the machine in real-time. If the motion planner was suddenly disconnected from the laser during upward-right line 520, the material might be wasted. It might be possible to order the machine to continue the motion plan from the downward-right line 510, but then part of the plan would be performed twice, resulting in possible damage to the material as the laser revisited the already-processed material; alternately, the motion plan might be instructed to resume from the downward line 540, resulting in an incomplete machining operation 550.

While an interruption in communication between the motion planner and the CNC machine is relatively unlikely in the typical case of a motion planner integrated into the CNC machine, it can be a relatively frequent occurrence if the CNC machine and motion planner are not integrated.

A segmented file consistent with implementations of the current subject matter can be created based on a consideration of a maximum buffer capacity of the CNC machine, which in the case of this example might hold the electrical impulses needed to implement the first six commands. Rather than sending the motion plan for all six commands to the laser, the motion planner can instead identify a point (or points) at which the execution of the motion plan could be paused and resumed without affecting the final output. In this example, that would be anywhere during the upward-right line 530 that occurs when the laser is off. The motion planner can therefore create a segment with the impulses for the first five commands and send this segment to the CNC machine. The CNC machine would wait until the motion plan for all five commands were stored in its buffer (e.g. until the full segment was received), and then execute the commands in the segment. Under normal operation, the motion planner would prepare and the machine would receive a second segment, completing the machining operation, before the first one was complete. However, if the motion planner were slow, for example an underpowered computer, or if the second segment were delayed, for example by network traffic, a network disconnection or failure (for example by someone tripping over the cable), then the CNC machine can be able to pause in a resumable condition safely, with the laser off, awaiting further commands. It can be possible to include more data past the end of the segment, for example the start of the next segment, as long as the safe pausing point—the termination of the segment—is clearly identified should the full next segment not be received before reaching the end of the prior segment.

A second approach besides segmenting is also within the scope of the current subject matter. Instead of segmenting the motion or execution plan into one or more segments with a safe pause point, the CNC machine can be optimized to allow pausing and resuming at any point. This approach may still result in some perceptible physical effects of pausing and resuming in the final product. However, when applied carefully consistent with implementations of the current subject matter, such errors can be minimized.

To implement this second approach, the motion plan can be streamed from the motion planner in the usual fashion. However, if there is an interruption, the CNC machine can take responsibility for arranging for a "graceful" pause and subsequent resumption of operations. One or more of a number of tactics may be used to optimize this outcome. First, the machine may precisely note the time of the data interruption or identify the last instruction executed or the final piece of motion plan data fed to the motors. A sufficiently capable motion planner knows a great deal of information about the system at every instant: e.g. position, velocity, laser tube output power, etc. Provided with nothing more than the time at which data ceased to arrive or final instruction, it may be capable of calculating a new motion plan that can resume the machining operation with minimal disruption. For example, in the case of a laser, the motion planner may command a replay of the entirety of the motion plan up to the moment of interruption with the laser off, then turn on the laser very close if not precisely at the point in the motion plan at which the interruption occurred. Alternately, the motion planner may truncate the majority of the motion plan, and instead arrange for the moveable components to achieve the correct position, speed, and other parameters necessary to resume the cut. Note that lasers affect materials based on their speed as well as their power, so it is not sufficient to simply locate the original position.

Second, with contact with the motion planner interrupted, the CNC machine may use a locally-generated or pre-calculated motion plan to bring the machine to a safe stop. This approach can include turning off the laser in the case of a laser cutter. A sudden stop can cause problems such as missed steps on a stepper motor, so the machine might instead bring the moveable components to a gradual stop.

Third, at some point after the pause occurs, the CNC machine may use onboard sensors to detect a state of the system. For example, the CNC machine may use a camera to detect where the cutline ended, or position sensors to detect where the head is after shutdown, or other parameters that would assist with the system restart. Finally, a revised motion plan can be created and executed that, as closely as possible, resumes the state of the laser at the moment when the last data was executed. This approach may suffer from minor defects, such as a small break 570 on the right side of the 'v' in cut 560 as the resumed motion was not able to perfectly align with the previously terminated motion, but it can come close, in many cases imperceptibly so.

This approach may also be used for interruptions not caused by a disconnection from the motion planner. For example, existing laser cutters will shut off the laser immediately if their safety interlock is tripped, for example if the door is open. However, they do not have the ability to resume seamlessly if the user closes the interlock. The same safe-pause techniques may be used to arrange for a graceful resumption of machining after a user-induced stop.

Lasers are particularly well suited for this type of behavior, because they can turn off the laser at a moment's notice. Other types of machines may be able to implement this functionality by, for example, having a mill bit halt or retract quickly, having a waterjet shut off, or similar immediate cessation of operation.

Interruptions that may occur during processing typically require a halt to all processing. Halting operations may be achieved via numerous methods, including issuing an instruction to arrest actions and/or remove power from systems (although this may cause mechanical strain or misalignment), calculating a new motion plan or looking up a suitable motion plan from a remote or local processer and attempting to, for example, execute it rapidly to effect a controlled halt to operations, or by changing the speed at which the existing motion plan is followed, for example decreasing the playback speed of a precomputed motion plan so as to bring it to a halt in a controlled fashion.

Changing Speed of an Existing Motion Plan for Safe Pause & Resumption.

Figure 6:
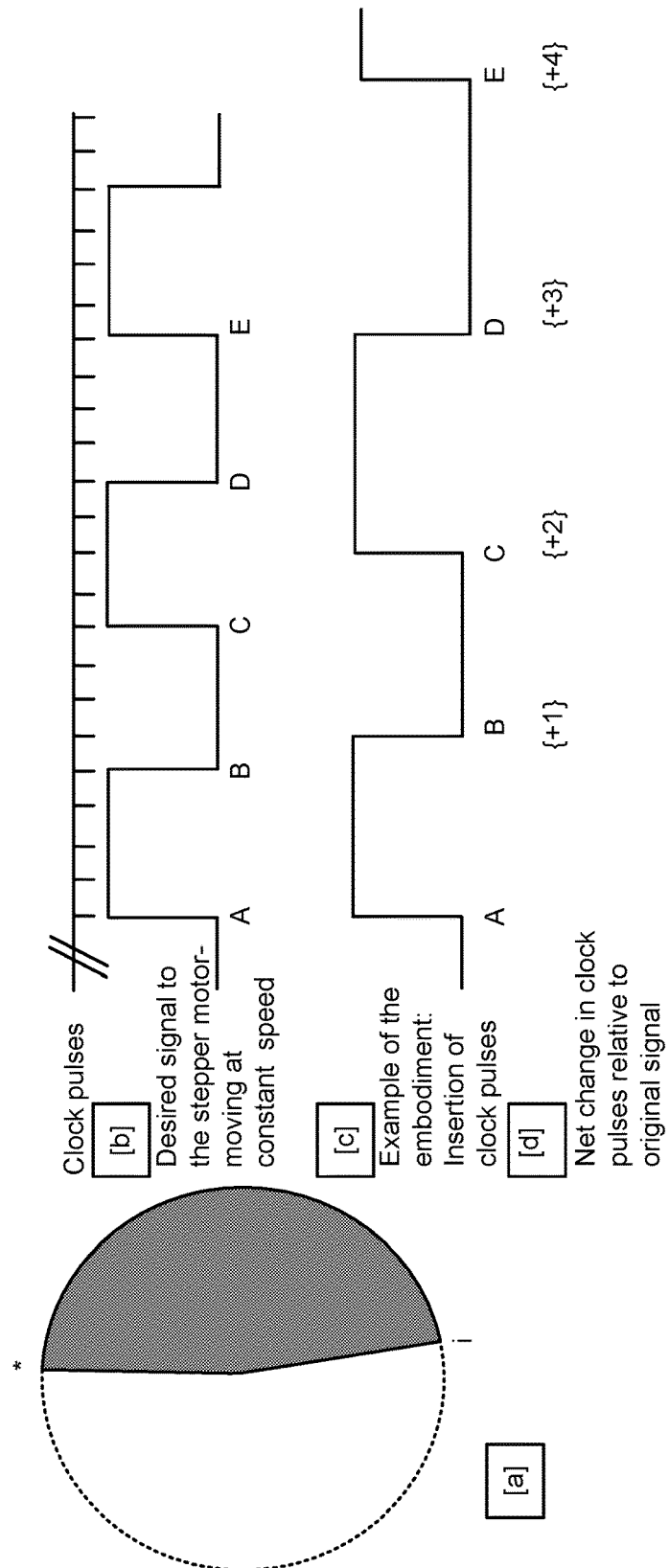
FIG. 6 is a diagram illustrating an example of altering a rate of execution of a motion and/or execution plan for a CNC machine, consistent with some implementations of the current subject matter.

FIG. 6 is a diagram illustrating an example of altering a rate of execution of a motion and/or execution plan for a CNC machine, consistent with some implementations of the current subject matter. In some implementations, the CNC machine can determine that a moveable component needs to halt, slow, or otherwise be interrupted from execution of the normal motion plan (e.g. a safety interlock triggering indicating a user has opened the machine during processing). In response, in some implementations, the motion plan can incorporate a "delay factor" associated with one or more types of operational instructions. This can effectively cause a reduction in motion plan implementation speed. Accordingly, the consideration of the delay factor can cause a reduction in speed, velocity, or higher order derivatives of the motion of the moveable component. As the delay factor approaches infinity, this can have the effect of creating a "safe pause," that is a cessation of motion in a known state without exceeding operational constraints such as maximum speed and acceleration, without the requirement for any motion plan re-computation. In this way, the temporal component of operational instructions (e.g. pulsed instructions), may be altered in this manner without requiring re-calculation by the motion plan when changing circumstances make the original motion plan suboptimal.

In some implementations, shown by the example in FIG. 6, a system can have a component that can be moved by a stepper motor and used to cause a desired change in a material, shown as tracing a circular path by FIG. 6[a]. The circle illustrates that the circular motion of the moveable component begins at the top of the circle, marked with a * in FIG. 6[a]. The motion plan executes normally until an interrupt is executed at position i on the circle. The dashed line indicates the uncompleted part of the motion plan after the point of interruption. In this example, an interruption (e.g. sudden opening of the lid) can require the stepper motor to be halted (as shown at point i in FIG. 6[a]).

FIG. 6 [b] illustrates an example signal to the stepper motor when the motor is moving at a steady speed along the X axis of motion. In FIG. 6 [b], a train of clock pulses are shown which indicate the times at which transitions may be requested of the stepper motor signal line. The signal line transitions are labeled A-E, where, for example, A indicates a low-to-high to the step line of the stepper motor driver, for example instructing the motor to take one step. The high input remains for 4 clock pulses. Then, at B, the signal to the stepper motor goes low, for example having no effect except to prepare the line for the next transition. The low input remains for 4 clock pulses, and so on.

A delay factor can be any kind of delay or time factor associated with motion of the moveable component. In the example of FIG. 6, the delay factor is implemented relative to clock pulses associated with or generated by a processor. A clock pulse can be generated at a given time interval, such as a second, millisecond, or the like. In other implementations, a clock pulse can be a periodic output of another device, such as a processor, timer, circuit, or the like. In the specific example of FIG. 6[b], the time constant is 4 clock pulses. According to the original motion plan, this can cause a step to occur every 4 clock pulses.

FIG. 6[c] illustrates an example of lengthening the intervals between signals sent to the stepper motor by repeating the designated signal for a number of additional clock cycles designated by the delay factor. In some implementations, a time constant associated with movement of the moveable component, for example a stepper motor, can be altered. The altering can be based on, for example, increasing or decreasing a time constant between signals sent to the stepper motor by the amount of the delay factor.

In one example, a constant positive delay factor slows machine operation by a constant amount. An increasing positive delay factor decelerates machine operation as long as the delay factor increases. A constant negative delay factor speeds machine operation by a constant amount. A decreasing negative delay factor accelerates machine operation as long as the delay factor decreases.

FIG. 6[d] illustrates a steadily increasing delay factor. The delay factor can be lengthened by, for example, repeating instructions a number of times per signal line transition, skipping a number of pulses per signal line transition, slowing the frequency of clock pulses, or any other mechanism that has the effect of slowing playback of the signal line. This can cause an increasingly extended period between each pulsed operation. As a result this can cause gradual slowing of the motion of the stepper motor, for example, to a point where a stepper motor clamp can be safely applied to retain the stepper motor in a halted position. In the example of FIG. 6, instead of signal transition B occurring 4 clock cycles after A, an instruction can be repeated for an additional clock cycle per signal transition as shown in FIG. 6[d], resulting in the signal pattern shown in FIG. 6[c]. Similarly, two repetitions can be inserted between execution of B and C, effectively adding a delay of 2 clock cycles.

In another implementation, rather than inserting additional instructions with the same clock to slow down operation, the existing clock and signal may be delayed by a delay factor. For example, the clock and signal may be instructed to omit a clock cycle for the first two transitions, then two cycles for the next two transitions, etc. If the step signal is driven by the clock, then simply delaying the clock has the desired effect; if the step signal and clock are generated independently, then both must be delayed.

In another implementation, the frequency of the clock may be slowed, for example changing from 1 kHz to 10 Hz continuously or discontinuously over the course of a minute.

These are only intended as an example; any mechanism for speeding up or slowing down the playback of the motion plan can have the desired effect.

While one stepper line and its associated clock is shown for clarity, it should be understood that this technique may be applied to multiple motors as well as the tool control (for example the laser enable signal in a laser cutter) and other systems to effect the desired behavior of a change of whole system execution speed.

As a result, in some implementations, changing the speed of the stepper motor can be achieved while preserving the intended path of the stepper motor. This can be performed without data-intensive calculations of acceleration curves, etc. In other implementations, when the delay factor (describing the increased number of clock pulses or other method of delaying execution of the motion plan) is calculated (for example in advance), this can provide a gradual enough deceleration of the moving that strain limits are not exceeded for the system. This can have the beneficial effect that the system being controlled, e.g. the stepper motor does not exceed operating parameters, for example, miss a step and land in an unknown position. This approach also conveys the advantage of allowing the system to determine and record the precise state of the system both at the time of the interruption and at the time of the halt, assuming the previous constraint is observed.

While some implementations described herein are cast in terms of adding or removing clock cycles to effectively alter execution of a motion plan, this is not intended to be a limiting example. In other implementations, the altering of the motion plan can include modifying a rate at which portions of a motion plan are received at the CNC machine, causing a mechanical delay in implementation of motion plan instructions, introducing a digital element that buffers instructions to slow them and reduce the output rate, or the like.

Figure 7:
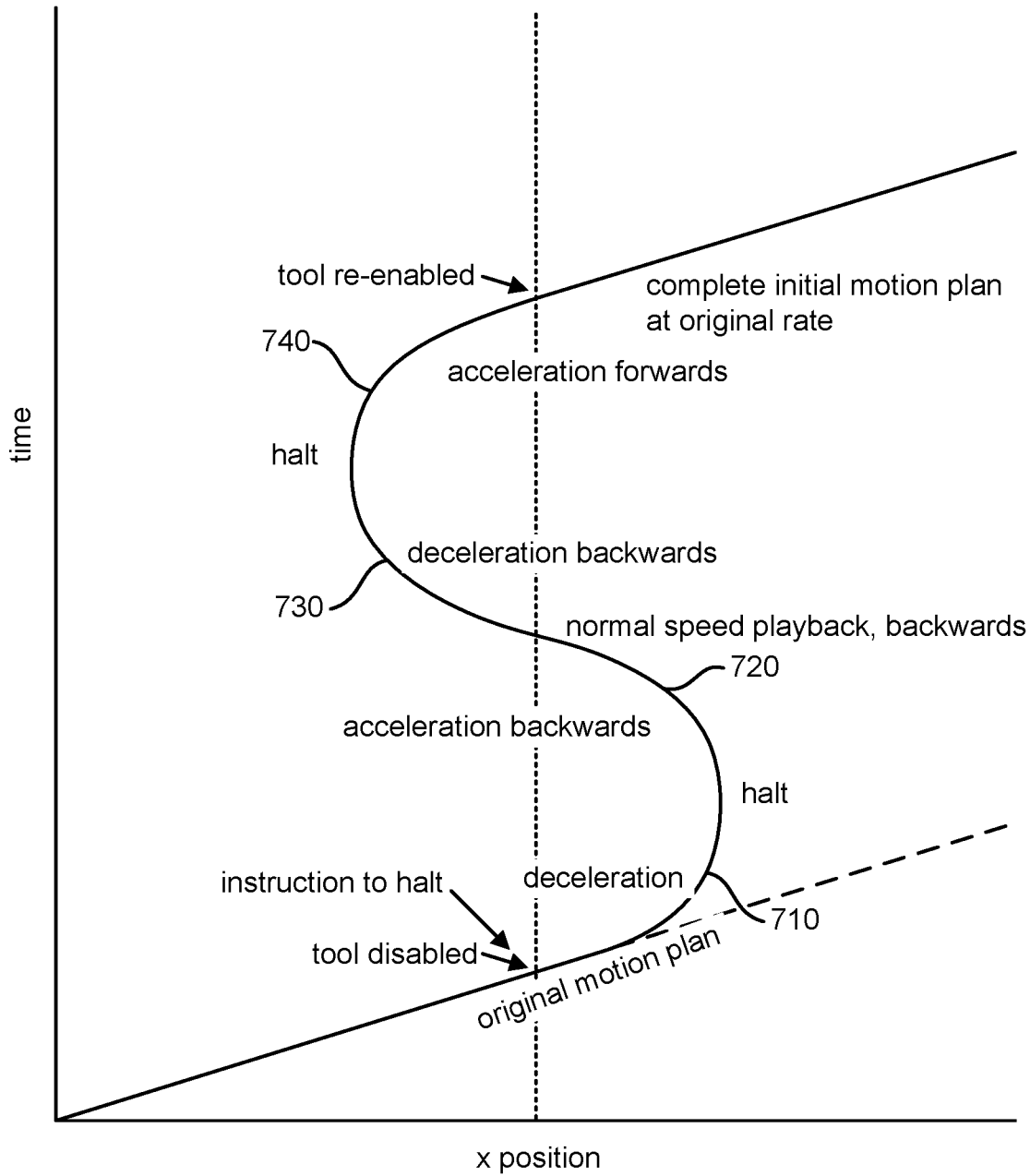
FIG. 7 is a diagram illustrating a resumption of operations in a CNC machine, consistent with some implementations of the current subject matter.
Figure 8:
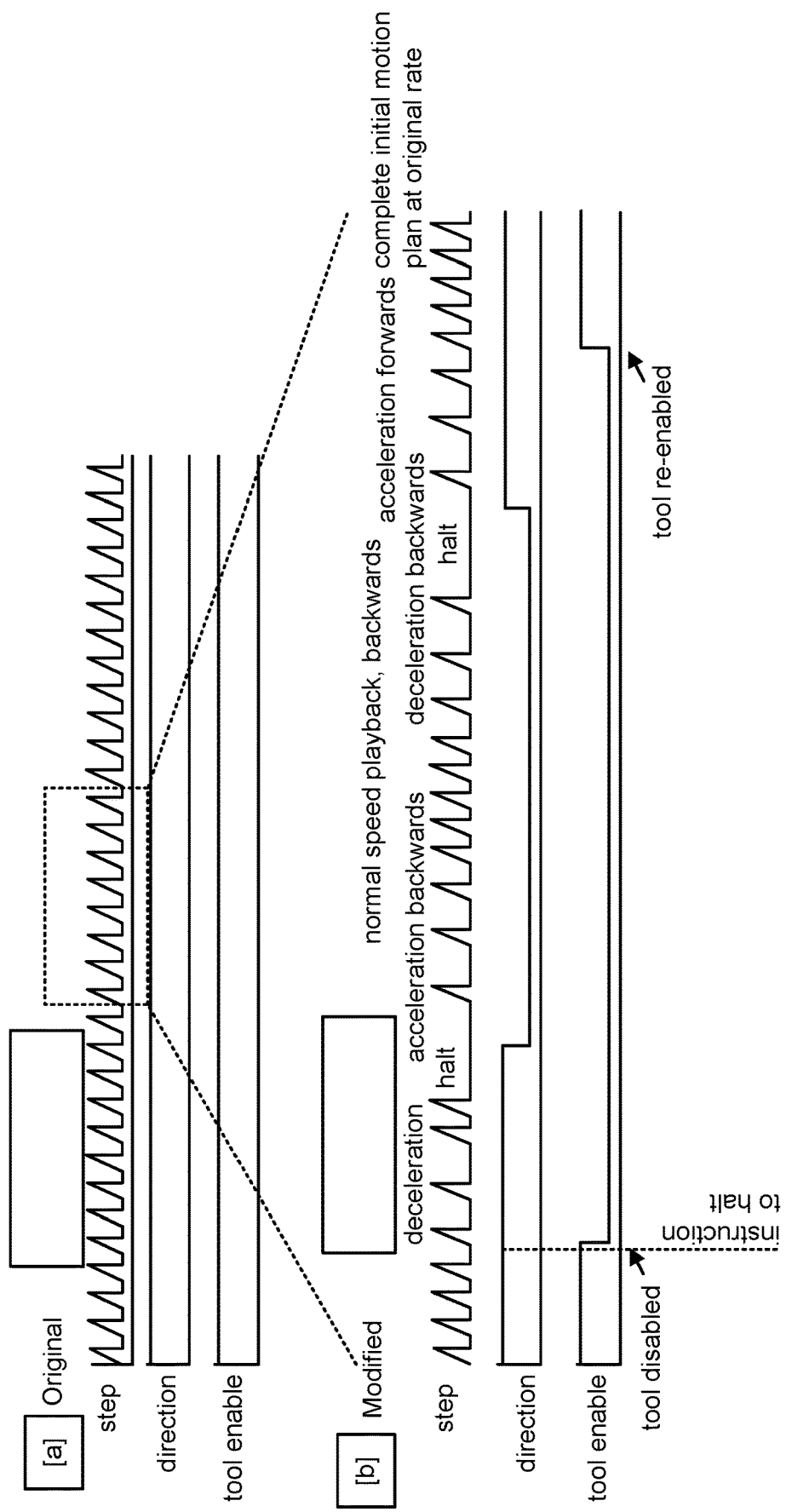
FIG. 8 is a diagram illustrating an altered sequence of pulsed operation described by a motion plan, consistent with some implementations of the current subject matter.

FIG. 7 is a diagram illustrating a resumption of operations in a CNC machine, consistent with some implementations of the current subject matter. FIG. 8 is a diagram illustrating an altered sequence of pulsed operation described by a motion plan, consistent with some implementations of the current subject matter.

In some implementations, precise resumption of operations following a pause can be achieved without additional calculations by playing a portion of the motion plan in reverse, effectively using a negative delay factor. In other implementations, the portion of the motion plan that can be played in reverse can be the portion of the motion plan that was executed at an altered rate to cause a deceleration of a movable component. This can involve copying and mirroring some portions of the delays or time constants applied to the commands for the movable component.

In FIG. 7, the X-axis position of a movable component is shown as plotted against time. Initially, an example original motion plan causes a movable component to have a constant speed on the X axis. However, the machine receives an instruction to halt, and the tool, for example a laser, is immediately disabled. The movable component decelerates, halts, accelerates in the reverse direction, halts again, then accelerates to a point where the motion plan can resume normally, enables the tool, and completes the original motion plan.

In some implementations, motion plan playback can be accelerated (as opposed to just decelerated as described with reference to FIG. 6) by altering the time constant such that is it shortened across the a portion of the operating instructions. Shortening of the time constant can be achieved via deletion of clock cycles assigned to operating instructions, removal of repeated instructions, acceleration of the clock frequency, and other means. However, in some cases, this can cause the CNC machine to exceed its operating parameters, for example accelerating too quickly or requesting that the motors move faster than their maximum rated speed.

In the example shown in FIG. 7, a constant velocity movable component is interrupted by receiving an instruction to halt. In some implementations, a resumption of the motion plan can be performed by a combination of playing the altered time constants in a forward or reversed order, and commanding the step taken at each time to be either the original direction or in a reversed direction. FIG. 7 illustrates a deceleration 710, an acceleration backwards 720, a deceleration backwards 730, and an acceleration forwards 740. The deceleration 710 can be similar to that described in FIG. 6, where the time constant can be increased to cause a deceleration, which can include an eventual halt, of the movable component. The time for which the movable component is halted is arbitrary and may be zero. To resume operation according to the original motion plan, the deceleration can be played back in reverse, but with the commands to the stepper motor (and/or any other systems) also being issued to cause the movable component to accelerate 720 backwards in a direction opposite to the original motion plan. When the playback is complete, the movable component should have the same speed as called for in the original motion plan at the time of interrupt, albeit in the opposite direction. Then, a second deceleration 730 can occur by applying the previous alteration of the time constant, but this time to the movable object which is moving in the reversed direction. This can cause a deceleration substantially identical to that in 710, resulting in a second halt. Again, the duration of the second halt is arbitrary, and need not be the same as the prior halt. After the second halt, the motion plan can be resumed by accelerating 740 the movable component. This acceleration 740 can include, for example, stepping the movable component in the desired direction and, alternatively, i) reversing the alteration of the time constant in 710 or replaying the alteration of the time constant in 720. After the second acceleration 740, the movable component should have the same velocity as it did before receiving the instruction to halt. The tool, for example the laser, can be reengaged to resume normal operation. FIG. 8 shows plots corresponding to the example of FIG. 7. These plots include pulses to cause steps to be taken, the direction of the movable component, and whether the tool is enabled. It should be noted that steps and stepper motors are used only as an example; other systems under control, such as actuators driven by analog signals (for example galvanometers) or other systems (such as a cooling fan that may be enabled/disenabled) may be have their on/off times delayed or accelerated, and/or their operating speed accelerated/decelerated, depending on the desired system behavior.

In some implementations, there may be latency to reengage a tool, for example, a laser turn-on time, a spin-up of a drill bit, etc. In these implementations, the tool can be reengaged to allow sufficient time for the operation of the tool to also be the same as it was when the instruction to halt was received. In either speeding up or slowing down operations, mechanisms to resize waveforms accurately may be used, such as accumulating rounding error and compensating for it in later clock cycles, dithering to improve temporal resolution, etc. For example, if a series of pulses lasting 5 clock cycles is to be extended by 50%, the system may alternate between 7 and 8 clock cycle pulses so as to produce an average pulse length extension of 50%.

Figure 9:
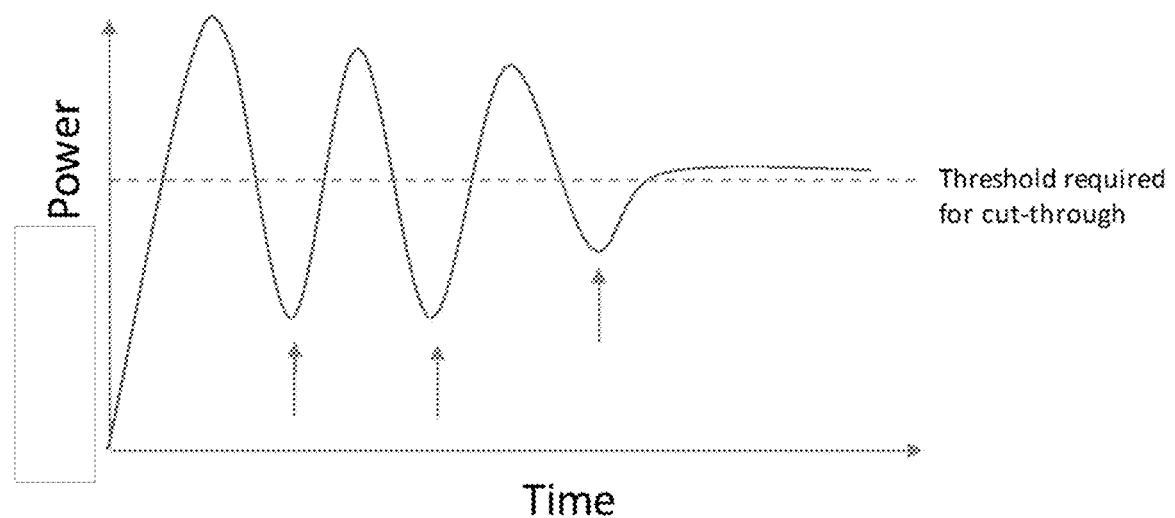
FIG. 9 is a diagram illustrating correcting for fluctuations in laser power output, consistent with some implementations of the current subject matter.

FIG. 9 is a diagram illustrating correcting for fluctuations in laser power output, consistent with some implementations of the current subject matter. In some cases, a laser with unstable power output (e.g. temporary spikes, or dips in laser power, such as from wall voltage sag), can create a risk of incomplete material cut-through. In some implementations, the desired effect on the material (e.g., cut-through), can still be successful despite output power fluctuations, provided the movement of the laser beam across the material can be slowed or sped up to compensate accordingly to keep power-per-unit-time values within operating parameters. However, the nature of the output instability may offer very little time for such calculated compensations to take place, unless real-time adjustments can be deployed which circumvent the need for motion plan re-calculation. In some implementations, sensor feedback may be used to measure power output, compare output to expected values, and shorten or lengthen the delay factor accordingly via insertion or removal or clock cycles as appropriate. Sensors that can be used for such purposes include, optical sensors monitoring beam emission or an effect on the material, current or voltage sensors tied to the laser output, or the like.

An example of a laser with fluctuating power is shown in FIG. 9. At some times, the laser power is over the threshold to cause cut-through, and at other times it is below the threshold (shown by the arrows). While the failure to cut-through is one off-normal condition to be corrected, too much power due to fluctuations can also be undesirable. In both cases, the modification of playback speed of the motion plan, for example by skipping or doubling clock cycles, can be altered to slow down or speed up the movable component, and hence stabilize the delivered power to the material to a level slightly above the threshold required for cut-through. In FIG. 9, when the power output is below the threshold, the movable component can be slowed in order to provide a longer energy deposition time, to compensate for the reduced output power detected by the sensors. While the above is discussed in the context of a laser cutter and cut-through, similar adjustments can also be performed with regard to engraving, milling, or the like.

Motion Plans with Built-in Headroom

As previously mentioned, speeding up a motion plan may create physical or mechanical incompatibilities, for example, by producing instructions that exceed the maximal velocities or forces that may be safely exerted by the CNC machine. In some implementations, this can be rectified by creating a standard motion plan that has tighter constraints to allow for subsequent speed-ups. This built-in headroom can then tolerate shortening the time-constant for the purpose of accelerating playback up to the amount used as a parameter during initial calculation (e.g. 50% increased playback). This can ensure that the resulting motion plan does not cause parameters of the operation of the CNC machine to fall outside their allowable range when a permissible degree of accelerated playback is requested.

In some implementations, this can include modifying a requested motion plan to perform substantively the same operations, patterns, power deposition, and the like, but at a predetermined reduction of execution rate under normal (non-accelerated) operation. For example, instead of the motion plan being created to cut a pattern at the maximum possible speed, the speed over some portions can be reduced. The reduction can be, for example, 5%, 10%, 25%, 50%, etc. The reduction can also be based on a physical parameter, such as a speed of a movable component in terms of m/s, rotations/min, or the like. This allows for the possibility of accelerating playback without exceeding maximum limits of motion parameters.

Motion Plans Supporting User-Configurable Modes

When requesting a motion plan, the user may desire a particular mode of operation (e.g., quiet mode, low-vibration mode, etc.) that imply particular output targets (e.g., not-to-exceed accelerations or reduced rate of material removal). To optimize for such preferences, the motion plan must select tradeoffs that typically relate to parameters like speed, focus, duration, and power. Conducting these optimizations at the level of the motion plan carries the advantage of configuring system-wide adjustments; for example, to achieve a quiet mode of operation, the motion plan may choose a strategy that lowers laser power such that the material removal rate is also lowered, resulting in additional noise-reducing effects (e.g., reductions in the heat generated in the tube and lowering Laser Generated Air Contaminants (LGAC) generation, which in turn permit fan motor reductions, etc.). It is likely that multiple strategies are possible to achieve the desired mode; in the present example, an alternative approach to achieving quiet operation may come from doubling head speed and instructing two passes to compensate for the reduced power per unit time, rather than a single pass, of the laser over the material. Alternately, the system may determine that slower head speed is desirable to reduce motor noise and decrease power to compensate for the increased power per unit time. The motion plan can pre-calculate the ways the desired effect may be achieved and alter the power dissipation and material removal rate accordingly.

For example, when the CNC machine receives a command to operate quietly, it may opt for a processing approach that removes material more slowly. For example, it may slow motion and reduce power. This may be accomplished by the motion planner as it calculates the motion plan. Using the same techniques as discussed previously, it may also be accomplished after the motion plan is complete by reducing the playback speed of the actuators and tool system, although in this case the tool's removal rate would need to be reduced so that, for example, laser power per unit time remains constant even as it is slowed. In this example, playback might be reduced in speed so that something that would have taken 1 second instead takes 1.1 seconds, a delay factor of 1.1; the tool's setting (for example laser power) might be reduced to 1/1.1, or 91%, as well to compensate for the reduced speed. In some cases, the predetermined factor can also be a number below 1.0 as well, to speed up the execution of the motion plan. In either case, the power output of the laser or other tool can be correspondingly adjusted to provide the desired effect at the material. For example, if a laser is moving at half-speed, the laser power can be reduced by a factor of two in order to have the energy delivered to the material be constant. The increased time to fully execute the motion plan can result in the fans having more time to clear the interior of the CNC machine of contaminants, or enabling them to run at a lower speed to achieve quieter operation.

Because a server can be a more powerful computer than a remote computer, for example a computer in the CNC machine itself, more detailed motion planning calculations can be performed at the server. The server can contain data on the physics of the CNC machine 100 that will be doing the fabrication, for example, cutting/layering parameters, machine information, material restrictions, etc. Advanced computational methods can be used to generate the motion plan, for example optimizing the motion of the head to not only generate an accurate set of instructions, but instructions that are executed in a minimum amount of time given a particular CNC machine. Conversely, the instructions may be optimized to minimize noise created by fans (by generating less heat, smoke, or debris by operating more slowly), they may be optimized to create minimum vibration (for a machine on an unstable surface, like a card table), they may be optimized for maximum accuracy and precision at the cost of speed, and/or they may be optimized for maximum speed at the expense of accuracy. The particular path chosen by the machine in moving from machining operation to machining operation is a complex problem and can be likened to the "travelling salesman" problem which has been proven to be NP-complete. Depending on the desired outcome, different optimizations can be used. For example, a nearest neighbor approach can be used to perform one set of motions, move to the location of the next set of motions, execute those, and so on. While being a simple algorithm, this may not be optimal when considering the fact that the motors have a finite acceleration and also given the feedback response of the cutters, pourers, etc. More sophisticated algorithms such as the Christofides algorithm can be used but the complexity of the calculation makes it best-suited to computation on the server, rather than requiring a powerful computer to be installed with every CNC machine.

Also, time-varying features associated with adding or subtracting material 140, such as head acceleration, variable laser burn, dulling of cutting surfaces, variations in flow rates of deposition materials, etc. can be calculated and accounted for when generating the motion plan by software on the server.

Figure 10:
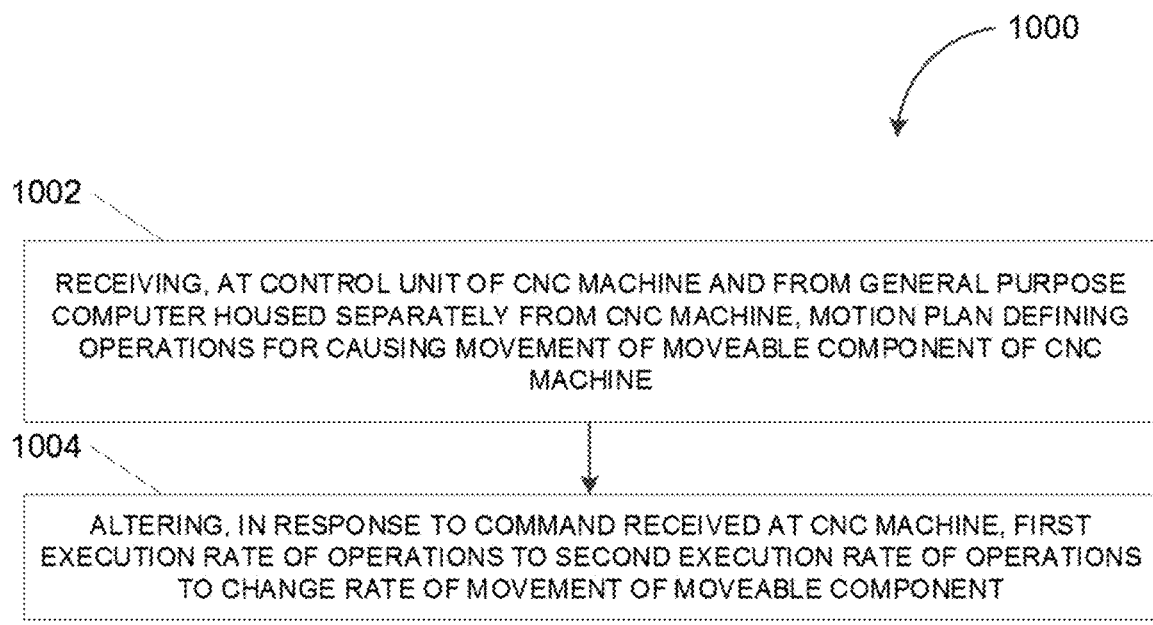
FIG. 10 is a flowchart illustrating a process for altering a rate of executing a motion plan, consistent with some implementations of the current subject matter.

FIG. 10 is a flowchart illustrating a process 1000 for altering a rate of executing a motion plan, consistent with implementations of the current subject matter. Referring to FIG. 10, the process 1000 can be performed by a CNC machine such as, for example, the CNC machine 100.

A control unit at the CNC machine 100 can receive, from a general purpose computer housed separately from the CNC machine 100, a motion plan defining operations for causing a movement of a moveable component of the CNC machine 100 (1002). As noted, in various implementations of the current subject matter, the CNC machine 100 can receive a motion plan that defines operations for execution by the CNC machine 100. For instance, the CNC machine can execute these operations by moving a moveable component such as, for example, a moveable head capable of delivering electromagnetic energy (e.g., laser), a drill bit, a cutting instrument, a 3D printer head, a printer head, and/or the like.

In response to a command received at the CNC machine 100, the CNC machine 100 can alter a first execution rate of the operations to a second execution rate of operations to change a rate of movement of the moveable component (1004). In some implementations of the current subject matter, the CNC machine 100 can decelerate and/or accelerate the rate at which the operations included in the motion plan are executed. As such, the second execution rate can be faster and/or slower than the first execution rate. As noted, the CNC machine 100 can alter the first execution rate to the second execution rate by introducing a delay factor, which may be a positive value that decelerates execution and/or a negative value that accelerates execution. Various techniques may be used to introduce the delay factor including, for example, by altering a playback of a signal line, altering an existing clock and signal, and/or the like.

In various implementations of the current subject matter, a method for altering a rate of executing a motion plan can include: receiving, at a control unit of a CNC machine and from a general purpose computer that is housed separately from the CNC machine, a motion plan defining operations for causing movement of a moveable component of the CNC machine; and altering, in response to a command received at the CNC machine, a first execution rate of the operations to a second execution rate of the operations to change a rate of movement of the movable component.

The CNC machine can deliver electromagnetic energy to effect a change in a material within an interior space of the CNC machine. The command can be initiated by a user. The command can be a halt command. The altering of the first execution rate to the second execution rate can include bringing the movable component of the computer-numerically-controlled machine to a stop in response to the halt command received at the computer-numerically-controlled machine. The movable component can be brought to a halt at least by sending commands to the movable component at a slower rate near an end of a motion of the movable component. Alternatively and/or additionally, the command can be a start command. The altering of the first execution rate to the second execution rate can include resuming an operation of the moveable component of the CNC machine in response to the start command received at the CNC machine.

The first execution rate can be altered to the second execution rate at least by adding a delay between one or more operations in the motion plan to change the rate of movement of the movable component. The one or more operations of the motion plan, including the delay, can be executed in a reversed order to accelerate the movable component. The delay can be added by repeating at least one instruction per signal line transition, skipping a number of pulses per signal line transition, and/or slowing the frequency of clock pulses. The alteration can be based at least on an image of the movable component. The image can be acquired with a camera in the computer-numerically-controlled machine.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-implemented method comprising:
   receiving, at a control unit of a computer-numerically-controlled machine and from a general purpose computer that is housed separately from the computer-numerically-controlled machine, a motion plan defining operations for causing movement of a moveable component of the computer-numerically-controlled machine;
   in response to a first command received at the computer-numerically-controlled machine while the moveable component is operating at a rate of movement, halting an execution of the motion plan by at least altering, to a first execution rate, an execution rate of at least a portion of the motion plan to reduce the rate of movement of the movable component; and
   in response to a second command received at the computer-numerically-controlled machine, executing, at a second execution rate, at least the portion of the motion plan in a forward order and in a reversed order in order to return the moveable component to the rate of the movement prior to the halting of the execution of the motion plan.

2. The computer-implemented method of claim 1, further comprising:
   delivering, by the computer-numerically-controlled machine, electromagnetic energy to effect a change in a material within an interior space of the computer-numerically-controlled machine.

3. The computer-implemented method of claim 1, wherein the first command and/or the second command are initiated by a user.

4. The computer-implemented method of claim 1, wherein the first command comprises a halt command, and wherein the rate of the movement of the movable component of the computer-numerically-controlled machine is reduced to stop an operation of the moveable component in response to the halt command received at the computer-numerically-controlled machine.

5. The computer-implemented method of claim 4, wherein the operation of the movable component is stopped by at least sending commands to the movable component at a slower rate near an end of a motion of the movable component.

6. The computer-implemented method of claim 1, wherein the second command comprises a start command, and wherein the rate of the movement of the moveable component of the computer-numerically-controlled machine is returned to the rate of movement prior to the halting of the execution of the motion plan in response to the start command received at the computer-numerically-controlled machine.

7. The computer-implemented method of claim 1, wherein the execution rate of at least the portion of the motion plan is altered by at least adjusting a delay between one or more operations in the motion plan.

8. The computer-implemented method of claim 7, wherein the delay is adjusted by repeating at least one instruction per signal line transition, skipping a number of pulses per signal line transition, and/or slowing the frequency of clock pulses.

9. The computer-implemented method of claim 1, wherein the execution rate of at least the portion of the motion plan is altered based at least on an image of the movable component, and wherein the image acquired with a camera in the computer-numerically-controlled machine.

10. A system comprising:
    at least one data processor; and
    at least one memory including instructions, which when executed by the at least one data processor, causes operations comprising:
        receiving, at a control unit of a computer-numerically-controlled machine and from a general purpose computer that is housed separately from the computer-numerically-controlled machine, a motion plan defining operations for causing movement of a moveable component of the computer-numerically-controlled machine;

in response to a first command received at the computer-numerically-controlled machine while the moveable component is operating at a rate of movement, halting an execution of the motion plan by at least altering, to a first execution rate, an execution rate of at least a portion of the motion plan to reduce the rate of movement of the movable component; and in response to a second command received at the computer-numerically-controlled machine, executing, at a second execution rate, at least the portion of the motion plan in a forward order and in a reversed order in order to return the moveable component to the rate of the movement prior to the halting of the execution of the motion plan.

11. The system of claim 10, further comprising:
delivering, by the computer-numerically-controlled machine, electromagnetic energy to effect a change in a material within an interior space of the computer-numerically-controlled machine.

12. The system of claim 10, wherein the first command comprises a halt command, and wherein the rate of the movement of the movable component of the computer-numerically-controlled machine is reduced to stop an operation of the moveable component in response to the halt command received at the computer-numerically-controlled machine.

13. The system of claim 12, wherein the operation of the movable component is stopped by at least sending commands to the movable component at a slower rate near an end of a motion of the movable component.

14. The system of claim 10, wherein the second command comprises a start command, and wherein the rate of the movement of the moveable component of the computer-numerically-controlled machine is returned to the rate of movement prior to the halting of the execution of the motion plan in response to the start command received at the computer-numerically-controlled machine.

15. The system of claim 10, wherein the execution rate of at least the portion of the motion plan is altered by at least adjusting a delay between one or more operations in the motion plan.

16. The system of claim 15, wherein the delay is adjusted by repeating at least one instruction per signal line transition, skipping a number of pulses per signal line transition, and/or slowing the frequency of clock pulses.

17. The system of claim 10, wherein the execution rate of at least the portion of the motion plan is altered based at least on an image of the movable component, and wherein the image acquired with a camera in the computer-numerically-controlled machine.

18. A computer program product comprising instructions, which when executed by at least one data processor, cause operations comprising:
receiving, at a control unit of a computer-numerically-controlled machine and from a general purpose computer that is housed separately from the computer-numerically-controlled machine, a motion plan defining operations for causing movement of a moveable component of the computer-numerically-controlled machine;

in response to a first command received at the computer-numerically-controlled machine while the moveable component is operating at a rate of movement, halting an execution of the motion plan by at least altering, to a first execution rate, an execution rate of at least a portion of the motion plan to reduce the rate of movement of the movable component; and in response to a second command received at the computer-numerically-controlled machine, executing, at a second execution rate, at least the portion of the motion plan in a forward order and in a reversed order in order to return the moveable component to the rate of the movement prior to the halting of the execution of the motion plan.

* * * * *